Patented Aug. 9, 1949

2,478,661

UNITED STATES PATENT OFFICE 2,478,661

OXAZOLONE DERIVATIVE AND PROCESS FOR PREPARING SAME

John A. King, Albany, N. Y., assignor, by mesne assignments, to Winthrop-Stearns Inc., New York, N. Y., a corporation of Delaware No Drawing. Application December 5, 1944, Serial No. 566,773

4 Claims. (Cl. 260—307)

This invention relates to a process for the preparation of oxazole derivatives and to the products obtained thereby.

The invention has for its object the provision of intermediates useful for the synthesis of penicillin.

In carrying out my invention, I proceed in the following manner. To an alpha-(alpha-haloacylamino)propionic acid having the formula

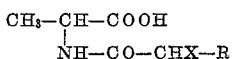

where X is halogen and R is a hydrocarbon radical containing 3–7 carbon atoms, there is added at room temperature a cyclizing agent such as a mixture of pyridine and acetic anhydride. The reaction mixture is allowed to stand for approximately one-half to one hour, during which time some solid material may deposit from solution, and then the whole reaction mixture is poured onto ice, whereupon the product is obtained as a precipitate.

The products obtained by practicing my invention are oxazole derivatives having either the structure

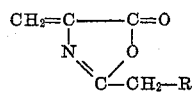

or the isomeric structure

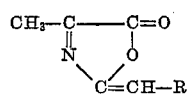

Since the system of double bonds may be mobile, a choice between these structures for the compounds as a whole cannot be made, although in the case of a given compound the chemical and physical evidence may weigh preponderantly in favor of one structure.

The alpha-(alpha-haloacylamino)propionic acids used as starting materials in my process can be obtained by the method of Fischer and Schmidlin [Ann., 340, 194 (1905)], whereby alanine is treated with the appropriate alpha-haloacyl halide in the presence of sodium hydroxide.

My invention is illustrated by the following examples but is not limited thereto.

Example 1

To 112.0 g. of alpha-bromophenacetylalanine there is added a mixture of 200 ml. of dry pyridine and 1000 ml. of acetic anhydride. The solution is allowed to stand for one hour at room temperature, during which time the solution warms to about 40° C. and a white solid is deposited. The whole of the reaction mixture is poured onto 4 kg. of ice, whereupon a light tan solid is precipitated. This solid is separated from the solution by filtration and dried in a vacuum desiccator. The dry product weighs 70.9 g. and melts at approximately 106–109° C. On recrystallization of the product from carbon disulfide or petroleum ether, the melting point can be raised to 120–122° C., but it has been found that the melting point varies somewhat depending on the method of recrystallization, indicating the possible existence of the compound in isomeric or polymorphic modifications. The variation in melting point may also be due to partial decomposition during extended handling. Quantitative analysis shows that the product has the empirical formula $C_{11}H_9NO_2$.

The compound exhibits an ultraviolet spectrum with absorption maxima at wavelengths 240 and 354 millimicrons, when determined in solution in benzene-free 96% ethyl alcohol. For these wavelength values the molecular extinction coefficients, as calculated according to Beer's law, are approximately 8,100 and 20,150, respectively.

These data indicate that in the case of this particular compound, the structure

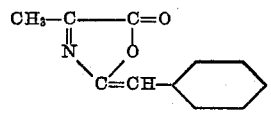

is more probable than the structure

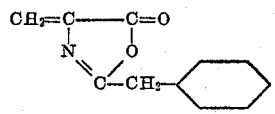

Example 2

To 30 g. of alpha-chlorophenacetylalanine there is added a mixture of 60 ml. of dry pyridine and 300 ml. of acetic anhydride. The solution is allowed to stand for thirty minutes, during which time a red color develops and a small amount of solid is deposited. The whole of the reaction mixture is then poured onto 1.5 kg. of ice. The light yellow precipitate thus obtained is removed by filtration and is dried in a vacuum desiccator. The product, which is identical with the oxazole derivative obtained in Example 1, weighs 21.3 g.

When, instead of the alpha-halophenacetylalanine, there is used in the above examples alpha-(alpha-halovalerylamino)propionic acid, alpha-(alpha-halopelargonylamino)propionic acid, alpha-(alpha-halo-alpha-cyclohexylacetylamino) propionic acid, and alpha-(alpha-halo-beta-phenylpropionylamino) propionic acid, one obtains the corresponding oxazole derivatives having in the 2-position hydrocarbon substituents containing four, eight, seven and eight carbon atoms, respectively.

Although I have found that, in general, the cyclization is most conveniently achieved by the use of a mixture of pyridine and acetic anhydride, other cyclizing means can be used provided that they exert both a dehydrohalogenating and a dehydrating effect. For example, the pyridine may be replaced by collidine, quinoline, or other such base. Likewise, instead of the acetic anhydride, there may be used propionic anhydride or benzoyl chloride.

I claim:

1. The compound, $C_{11}H_9NO_2$, having the structural formula

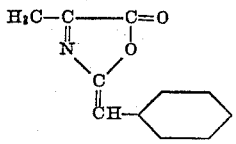

and exhibiting, in benzene-free 96% ethyl alcohol solution, an ultraviolet spectrum with absorption maxima at wavelengths 240 and 354 millimicrons, at which wavelengths the molecular extinction coefficients are approximately 8100 and 20,150, respectively.

2. The process for preparing an oxazole derivative which comprises treating, at room temperature, alpha-chlorophenacetylalanine with a mixture of pyridine and acetic anhydride.

3. The process for preparing an oxazole derivative which comprises treating, at room temperature, alpha-bromophenacetylalanine with a mixture of pyridine and acetic anhydride.

4. The process for preparing an oxazole derivative which comprises treating, at room temperature, an alpha-halophenacetylalanine with a mixture of pyridine and acetic anhydride.

JOHN A. KING.

REFERENCES CITED

The following references are of record in the file of this patent:

Chemical Abstract, vol. 20, 1926, page 2682⁶.
Jr. Biol., Chem., 129 (1939), pp. 359–360, 260–307.3.